(12) United States Patent
O'Krafka et al.

(10) Patent No.: US 7,823,013 B1
(45) Date of Patent: Oct. 26, 2010

(54) HARDWARE DATA RACE DETECTION IN HPCS CODES

(75) Inventors: Brian W. O'Krafka, Austin, TX (US); Roy S. Moore, Austin, TX (US); Pranay Koka, Austin, TX (US); Robert J. Kroeger, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 697 days.

(21) Appl. No.: 11/685,555

(22) Filed: Mar. 13, 2007

(51) Int. Cl.
*G06F 11/00* (2006.01)

(52) U.S. Cl. .................... 714/11; 714/12; 711/144; 711/147; 711/150

(58) Field of Classification Search ............ 714/11, 714/12, 47; 711/141, 144, 147–153
See application file for complete search history.

(56) References Cited

U.S. PATENT DOCUMENTS

| | | | | |
|---|---|---|---|---|
| 4,426,681 A | * | 1/1984 | Bacot et al. ............... | 711/130 |
| 5,029,070 A | * | 7/1991 | McCarthy et al. .......... | 711/143 |
| 5,175,837 A | * | 12/1992 | Arnold et al. ............. | 711/152 |
| 5,428,766 A | | 6/1995 | Seaman | |
| 5,551,005 A | * | 8/1996 | Sarangdhar et al. ........ | 711/145 |
| 5,710,881 A | * | 1/1998 | Gupta et al. .............. | 709/200 |
| 6,026,504 A | | 2/2000 | Hagiwara | |
| 6,536,000 B1 | | 3/2003 | Jackson et al. | |
| 6,763,434 B2 | * | 7/2004 | Arimilli et al. ............ | 711/146 |
| 6,928,520 B2 | * | 8/2005 | McAllister et al. ......... | 711/141 |
| 7,174,406 B1 | * | 2/2007 | Abdallah et al. ........... | 710/240 |
| 7,254,687 B1 | * | 8/2007 | Jeter et al. ............... | 711/163 |
| 2002/0087807 A1 | | 7/2002 | Gharachorloo et al. | |
| 2006/0075057 A1 | | 4/2006 | Gildea et al. | |
| 2006/0212754 A1 | | 9/2006 | Yamaguchi et al. | |
| 2007/0214333 A1 | | 9/2007 | Nijhawan et al. | |
| 2009/0198916 A1 | * | 8/2009 | Arimilli et al. ............ | 711/152 |

* cited by examiner

*Primary Examiner*—Philip Guyton
(74) *Attorney, Agent, or Firm*—Rory D. Rankin; Meyertons, Hood, Kivlin, Kowert & Goetzel, P.C.

(57) ABSTRACT

A method and system for detecting race conditions computing systems. A parallel computing system includes multiple processor cores is coupled to memory. An application with a code sequence in which parallelism to be exploited is executed on this system. Different processor cores may operate on a given memory line concurrently. Extra bits are associated with the memory data line and are used to indicate changes to corresponding subsections of data in the memory line. A memory controller may perform a comparison between check bits of a memory line to determine if more than one processor core modified the same section of data in a cache line and a race condition has occurred.

12 Claims, 5 Drawing Sheets

HARDWARE DATA RACE DETECTION IN HPCS CODES

BACKGROUND OF THE INVENTION

1. Field of the Invention

This invention relates to high-performance computing network systems, and more particularly, to race conditions in parallel computing applications.

2. Description of the Relevant Art

High performance computing is often obtained by exploiting parallelism in a software application. With multiple processor cores (possibly thousands) in a high-performance computing network system, independent instructions of an application may be executed in parallel to increase throughput. For example, these processor cores may operate on a same line in memory, but on different data within the line. Upon the completion of these instructions, coherency checking is needed to ensure a race condition did not occur, or that two or more processors did not modify the same data within the memory line. Currently, complex software methodologies are used to detect race conditions. However, software techniques involve significant overhead and, therefore, incorporate a performance penalty.

In view of the above, effective methods and mechanisms for managing coherency in parallel processing systems is desired.

SUMMARY OF THE INVENTION

Systems and methods for detecting race conditions and for obtaining information for debugging purposes in high-performance computing systems are contemplated. In one embodiment, extra bits, referred to as check bits, are placed on the memory data line or have their own region of memory to be stored. These bits are used to detect which section of a memory line (e.g., cache line) has been modified by a processor core in a parallel computing system during the execution of a code sequence in a software application. If two different processor cores modify the same section of data on a memory line, a race condition may occur. A section of the memory line may comprise a byte, two bytes, or any granularity desired by the system designers.

When a program (or core) modifies a section of data, the processor sets a corresponding check bit. During execution of a particular code sequence, a check bit for a particular section of the memory line should be set by only one processor core. Processor cores may write back the memory line with the extra check bits to the memory controller. The memory controller may perform a comparison to determine if more than one processor core modified a given section of a memory line. If it is determined that more than one processor core modified a given section, then a race condition has occurred and a trap or interrupt may be sent to the operating system. Also, the memory line address and the data in the application could be saved and used for a later debugging process.

These and other embodiments are contemplated and are disclosed in the following description and drawings.

DETAILED DESCRIPTION

High-performance computing may be obtained by exploiting parallelism in an application. For example, an application may comprise multiple processes, each of which may comprise one or more threads. Generally speaking, threads can execute independent of other portions of a process and may execute concurrently with other portions of the process.

As is well known, it is desirable to find as many instances as possible of instruction level parallelism (ILP) in an application in order to exploit parallel execution and increase throughput. Loop level parallelism (LLP) is one example of parallelism often identified for optimization. In order to define LLP, first consider a basic block of instructions including a sequence of instructions with one entry point, one exit point, and no control flow instructions (i.e. branch, jump) within it. The start of a basic block may, for example, be the result of a control flow instruction at more than one location in the application program. The end of a basic block may be a control flow instruction. Depending on the dynamic frequency of control flow instructions in the application, the number of instructions in a basic block may vary. Some of these instructions may depend upon one another, and, therefore, the amount of parallelism to exploit may be reduced. One manner of increasing the amount of parallelism to exploit is to target LLP, or have the execution of each iteration of a loop in an application overlap with other iterations.

An example of a portion of an application program that contains LLP follows.

for (i=1; i<=1000; i=i+1)
x[i]=x[i]+y[i];

In the sample code above, after loop unrolling has been applied to the above code (e.g., by the compiler), each of the 1000 iterations of the second line may be executed in parallel. Each iteration of the above program example may be run on an individual processor core and the new parallel code is run on as many processor cores as are available in the network at runtime.

Next, two examples of parallel computing systems containing processor cores where an application program may execute include Symmetric Multiprocessing (SMP) and Massively Parallel Processing (MPP) are discussed. Other types of systems are possible and are contemplated as well. Characteristics of SMP systems typically include a system with N processor cores, one operating system, one memory subsystem, and a global address space across all available memory. Scalability for SMP systems may be limited by memory bandwidth.

Figure 1:
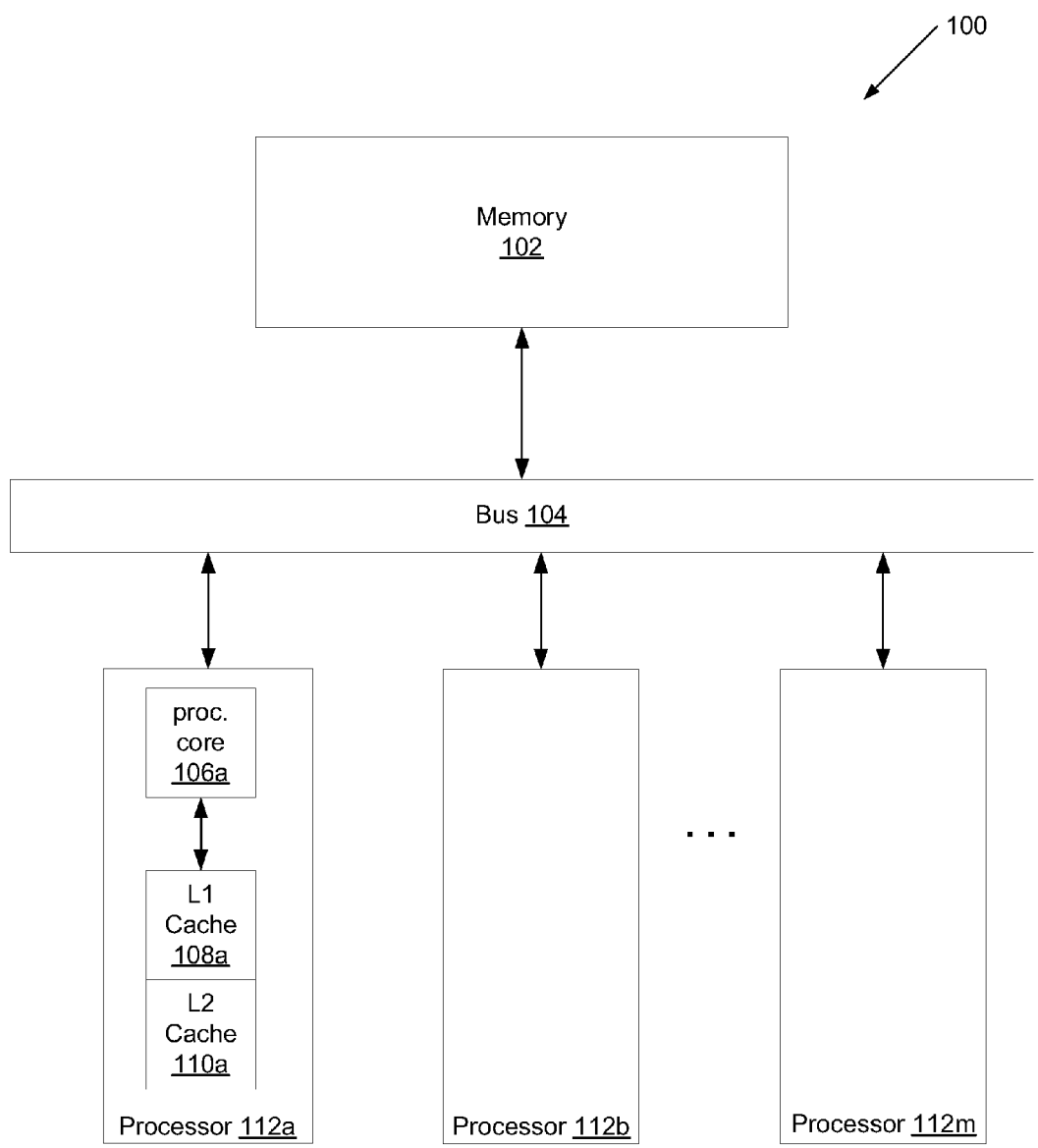
FIG. 1 is a block diagram of a system containing multiple processors and a single memory subsystem.

Referring to FIG. 1, one embodiment of a SMP system 100 is illustrated.

Included in the embodiment of system 100 is a memory subsystem 102 coupled via a bus 104 to processors 112a-112m. The bus 104 provides communication between memory 102 and processors 112a-112m. Processors and/or cores may be referred to as processing units. As used herein, elements referred to by a reference numeral followed by a letter may be collectively referred to by the numeral alone. For example, processors 112a-112m may be collectively referred to as processors 112. In one embodiment, each of the processors 112 may comprise a processor core 106a and two levels of cache, 108a and 110a. As each of the processors 112 may be executing instructions concurrently, coherency may be enforced in order to ensure the same memory line in memory 102 is not modified by two or more different applications which could result in one or more applications reading incorrect data.

Figure 2:
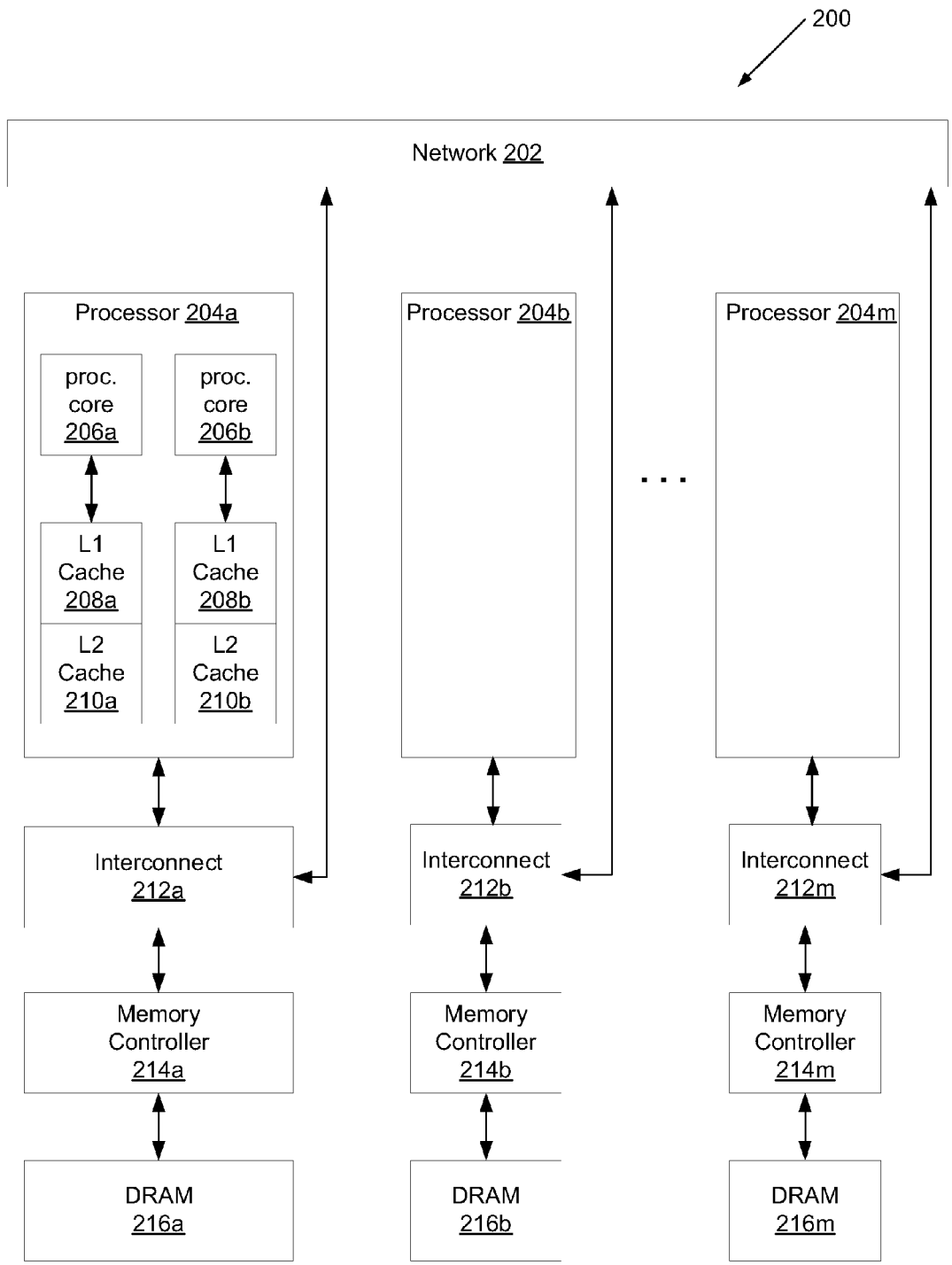
FIG. 2 is a block diagram of a system containing a cluster of nodes, each with one or more processors and its own memory subsystem.

Referring to FIG. 2, one embodiment of an MPP system 200 is illustrated. Characteristics of MPP typically include a system with M nodes, each including N processors and M operating systems. Each node may have its own memory subsystem. Further, no global address space exists across available memory, and scalability may lead to thousands of processors within the system. In this embodiment, network 202 allows each of the processors 204a-204m to communicate with each other. Also, processors 204 may communicate with each of the memories 216a-216m depending on the functionality of memory controller 214. In one embodiment, each of the processors 204 may comprise two microprocessor cores 206a-206b and two corresponding sets of two level caches, 208a-208b and 210a-210b. Different numbers of cores and caches are possible and are contemplated. An interconnect 212 (e.g., a crossbar switch) directs network traffic from network 202 to either one of the processors 204 or memory controller 214.

With either of the parallel computing systems of FIG. 1 or FIG. 2, during the parallel execution of a loop, two possible problems may arise. These problems will be described shortly. Generally speaking, data may be loaded from memory at the start of a code sequence (e.g., a loop), and the loop is then executed. While each processor core may operate on a same memory line, each core should be operating on different subsections of data within the given memory (e.g., cache) line. However, mistakes may be made by the application and two different processor cores may accidentally modify the same subsection of data such as the same byte of the same memory line. Therefore, coherency needs to be enforced.

At the end of a loop, for example, a processor core may have placed a result in the first byte of the cache line and the remainder of the cache line is the same as before. The memory controller may write back the cache line to memory and may or may not update only the changed portion of the cache line. A second processor core may have placed a result in the second byte of the cache line and the remainder of the cache line is the same as before. The memory controller may write back the cache line to memory and may or may not update only the changed portion of the cache line. Also, the memory controller may perform a system broadcast to ensure there is no overlapping of modified data. This continues with the results of the other processor cores. First, it is noted that with this method there may be many write backs and system broadcasts. Second, if a system broadcast is not performed, then a data race condition may not be detected. If a data race condition is detected, the address of the memory line does not specify which section of the cache line was written and which process performed the modification. For example, in an MPP system, there may be tens of thousands of nodes and it may not be possible to know which node performed the erroneous modification of the memory line.

Figure 3:
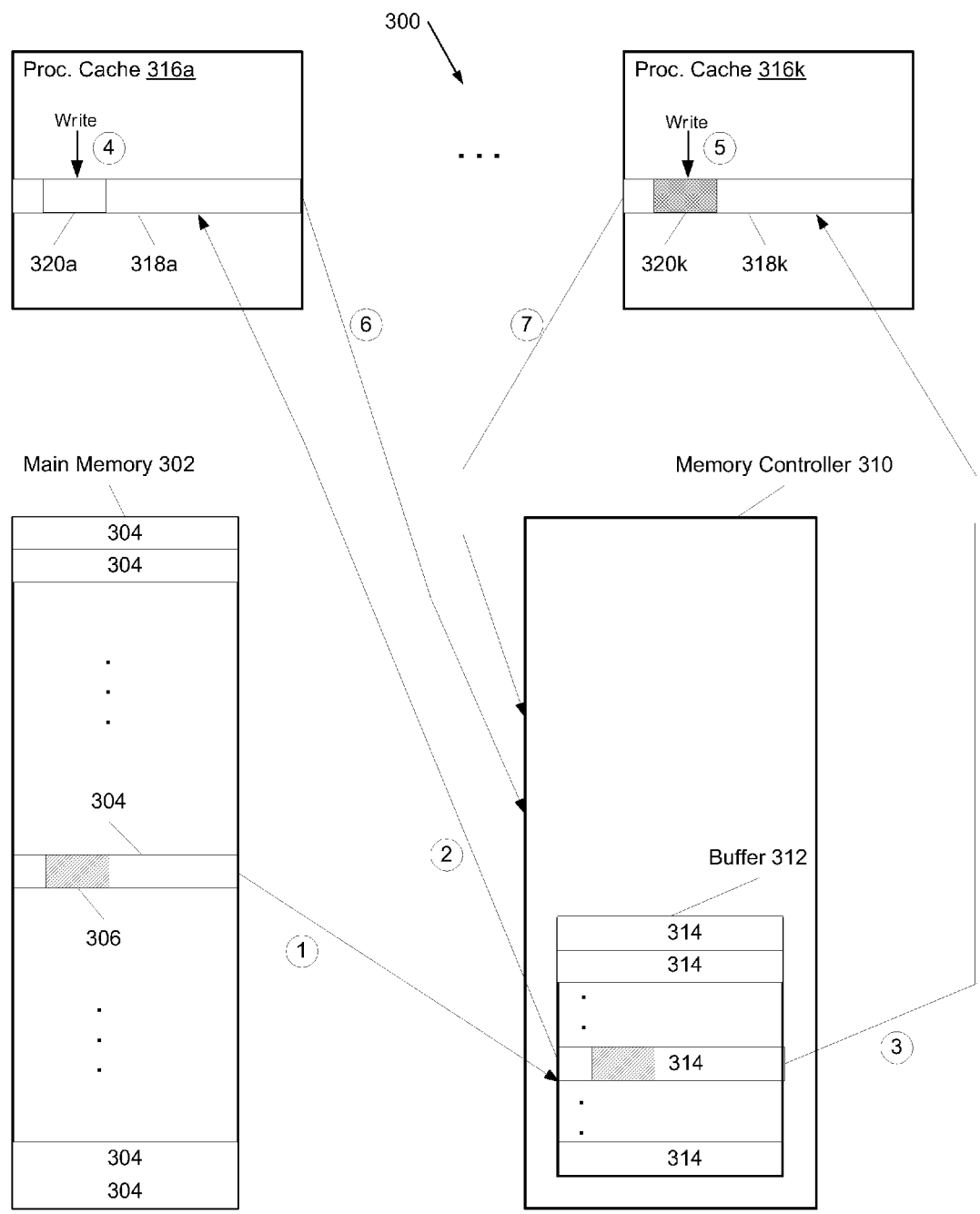
FIG. 3 is a block diagram illustrating one embodiment of a race condition during simultaneous code execution of multiple processors.

Now referring to FIG. 3, one embodiment of parallel execution sequences with multiple processors and a race condition is illustrated. In system 300, a main memory 302 comprises lines of data 304. One of the lines 304 is shown to include a subsection of data 306 that may be a byte, two bytes, or any other granularity. Main memory 302 is coupled to a memory controller 310. Memory controller 310 is shown to include a Buffer 312 with entries 314 configured to store data. For example, each of the entries 314 may be configured to store a line 304 of data. FIG. 3 shows the memory controller 310 coupled to processor caches 316a-316k. Processor cache 316a includes a cache line 318a used during the execution of a code sequence on a processor core, not shown, corresponding to cache 316a. In one embodiment, processor caches 316a-316k may include multiple cache lines arranged in a set-associative manner. The cache line 318a is shown to include a subsection of data 320a that may be a byte, two bytes, or other granularity, but in the embodiment shown, it is the same granularity as memory line section 306. An ordered sequence of events is depicted by the circled numbers in FIG. 3. This sequence is used in an example below.

For the embodiment shown in FIG. 3, a dataset is partitioned among the processors currently responsible for the execution of an application. Within these processors are one or more microprocessor cores and one or more caches. For this example, the granularity chosen for memory line section 306 is a byte. Memory byte 306 in memory line 304 may be needed by two applications being executed simultaneously or two iterations of a same loop being executed simultaneously of one application.

For this example, in sequence 1, the memory line 304 may be read from main memory 302 by memory controller 310 and placed in Buffer 312. Now Buffer 312 has a copy of memory line 304 in entry 314. In sequence 2, memory controller 310 may send this copy of memory line 304, residing in entry 314, to processor cache 316a for execution of a first application. The copy is stored as cache line 318a in processor cache 316a. At this time, prior to any cache line modifications, memory line section 320a corresponds to a copy of data section 306 in memory 302.

Later, in sequence 3, memory controller 310 may send a copy of memory line 304, residing in entry 314, to processor cache 316k for execution of a second application or a second code sequence of the first application. This copy is stored as cache line 318k in processor cache 316k. Memory line section 320k corresponds to a copy of data section 306 in main memory 302.

In sequence 4, memory byte 320a may be over-written in processor cache 316a by the first application. In sequence 5, memory byte 320k may be over-written in processor cache 316k by the corresponding application being executed on the processor core corresponding to processor cache 316k.

In sequence 6, the processor corresponding to processor cache 316a wishes to write-back the dirty cache line 318a. Therefore, cache line 318a is sent to memory controller 310. Memory controller 310 will over-write entry 314 in Buffer 312 with the contents of cache line 318a. In sequence 7, the processor corresponding to processor cache 316k wishes to write-back the dirty cache line 318k. Cache line 318k is sent to memory controller 310. Memory controller 310 will over-write entry 314 in Buffer 312 with the contents of cache line 318k. Here, we have a race condition. The same byte is modified by two different processors. Entry 314 may be written-back to main memory 302, but with erroneous results.

Figure 4:
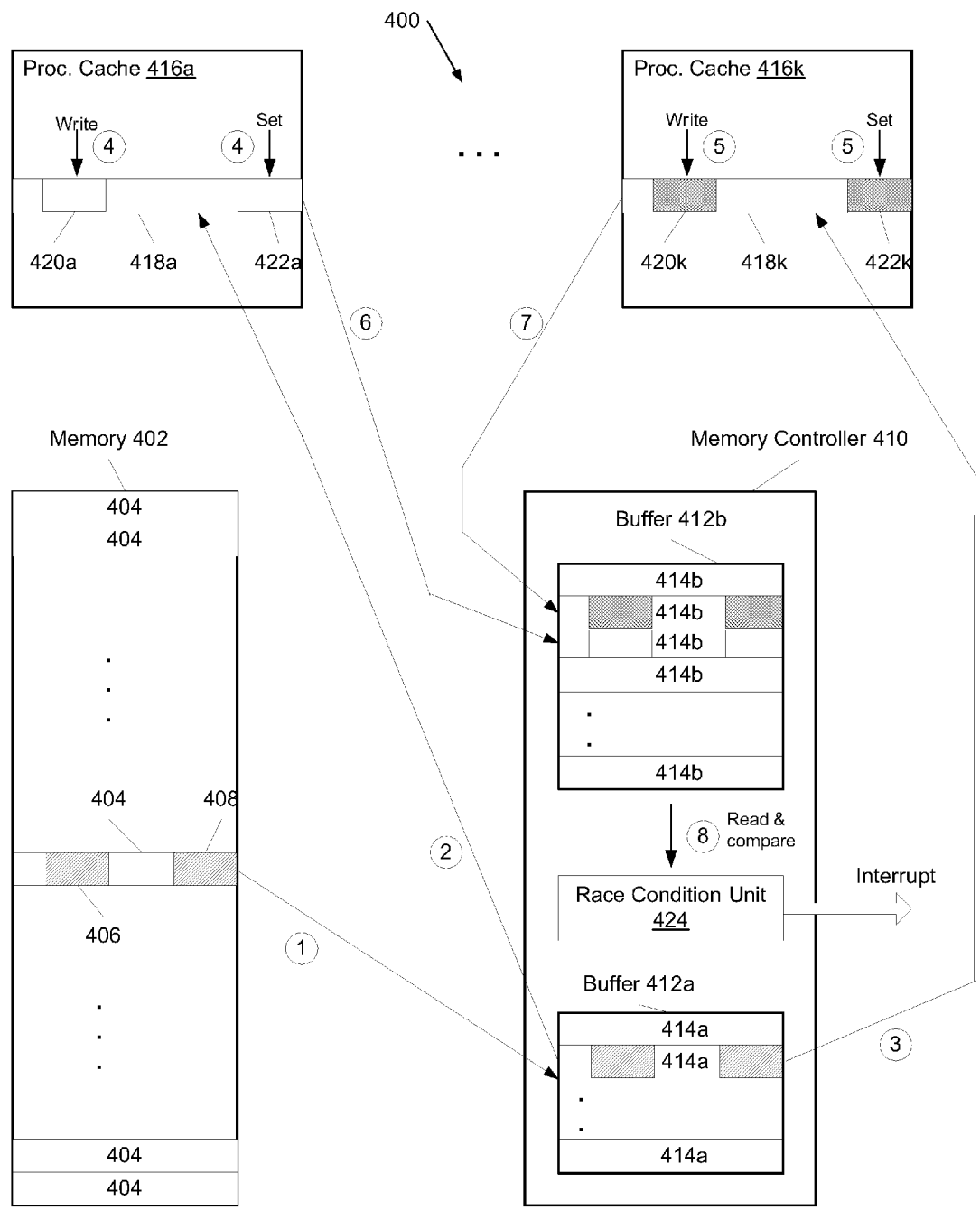
FIG. 4 is a block diagram illustrating one embodiment of a system configured to detect coherency problems during simultaneous code execution of multiple processors.

FIG. 4 illustrates one embodiment of system configured to manage the data coherency problem presented above. In system 400, a main memory 402 comprises memory lines of data 404 that include a section of data 406 that may be a byte, two bytes, or other granularity. Also, memory line 404 includes a section of check bits 408. Check bits 408 could alternatively be stored in another region of memory in main memory 402.

In the embodiment shown, they are placed at the end of a memory line. The number of check bits depends on the desired granularity for coherency checking (e.g., a byte-by-byte basis) and the size of the memory line.

Main memory 402 is coupled to a memory controller 410. Memory controller 410 includes a Buffer 412a with entries of data 414a for storing copies of memory line 404. Memory controller 410 further includes a Buffer 412b with entries 414b for storing data. Memory controller 410 further includes a Race Condition Unit 424 that performs a comparison operation to detect race conditions.

FIG. 4 shows the memory controller 410 coupled to processor caches 416a-416k. Processor cache 416a includes a cache line 418a used during the execution of a code sequence on a processor core, not shown, corresponding to cache 416a. The cache line 418a includes a section of data 420a that may be a byte, two bytes, or other granularity, but in the embodiment shown, it is the same granularity as memory line section 406. Also, cache line 418a includes check bits 422a. The size and arrangement of check bits 422a may be the same as the size and arrangement of check bits 408. An ordered sequence of events is depicted by the circled numbers in FIG. 4. This sequence is used in an example below.

For the embodiment shown in FIG. 4, a dataset may be partitioned among the processors currently responsible for the execution of an application. Within these processors are one or more microprocessor cores and one or more caches. For this example, the granularity chosen for memory line section 406 is a byte. Memory byte 406 in memory line 404 may be needed for two applications being executed simultaneously or two iterations of a same loop being executed simultaneously of one application.

For this example, in sequence 1, the memory line 404 may be read from main memory 402 by memory controller 410. The memory line 404 is placed in Buffer 412a. Now Buffer 412a has a copy of the memory line 404 in entry 414. the check bits 408 are then cleared. In sequence 2, memory controller 410 may send this copy of memory line 404, residing in entry 414, to processor cache 416a for execution of a first application. Entry 414 is stored as cache line 418a in processor cache 416a. At this time, prior to any cache line modifications, memory byte 420a corresponds to a copy of memory byte 406 in main memory 402. Check bits 422a may not correspond to a copy of check bits 408 in main memory 402 due to the copy of check bits 408 being cleared in entry 414 in sequence 1.

Later, in sequence 3, memory controller 410 may send a copy of memory line 404, residing in entry 414, to processor cache 416k for execution of a second application or a second code sequence of the first application. Entry 414 is stored as cache line 418k in processor cache 416k. At this time, prior to any cache line modifications, memory byte 420k corresponds to a copy of memory byte 406 in main memory 402. Check bits 422k may not correspond to a copy of check bits 408 in main memory 402 due to the copy of check bits 408 being cleared in entry 414 in sequence 1.

In sequence 4, memory byte 420a may be over-written or modified in processor cache 416a by the first application. The check bit in check bits 422a corresponding to memory byte 420a is then set. In sequence 5, memory byte 420k may be over-written or modified in processor cache 416k by the corresponding application being executed on the processor core corresponding to processor cache 416k. The check bit in check bits 422k corresponding to memory byte 420k is then set.

In sequence 6, the processor corresponding to processor cache 416a wishes to write-back the dirty cache line 418a. Therefore, cache line 418a is sent to memory controller 410. Memory controller 410 may then place dirty cache line 418a in Buffer 412b. In sequence 7, the processor corresponding to processor cache 416k wishes to write-back the dirty cache line 418k. Therefore, cache line 418k is sent to memory controller 410 which may then place dirty cache line 418k in Buffer 412b.

Memory controller 410 is aware of simultaneous use of a memory line, such as line 404 being read by multiple processor cores, whether line 404 is used by separate applications or by separate processes within a single application. In one embodiment, memory controller 410 may wait for a computation phase completion signal from all appropriate processors before allowing all copies of the memory line in buffer 412b to be read by race condition unit 424. Alternatively, memory controller 410 may monitor with a counter the number of processes that simultaneously use a particular memory line. Memory controller 410 may decrement the counter when a process completes its use of the memory line wishes to write-back its corresponding copy of the memory line to main memory 402. Then memory controller 410 will wait until the counter is zero again before allowing all copies of the memory line in buffer 412b to be read by race condition unit 424. Other ways of monitoring the beginning and end of a particular computation phase are possible and are contemplated.

In sequence 8, memory controller 410 has determined that all simultaneous executing processes have completed use of a particular memory line. Race condition unit 424 then reads all copies of the given line in buffer 412b. In this example, there are only two copies corresponding to dirty cache lines 418a and 418k stored in buffer 412b. The check bits, 422a and 422k, may then be compared by race condition unit 424. If a match is found on a corresponding pair of check bits (e.g., bit 2 of check bits 422a and bit 2 of check bits 422k), then two different processor cores modified the same byte of the given line, or byte 406, in this example, and a race condition is detected. Sequence 8 may further involve an interrupt sent to the operating system (O.S) to signal a race condition. Also, the address of the given memory line 404 may be sent to the O.S. This address may be later mapped back to the data in the application for debugging purposes. If no match was found, then no race condition is detected. Memory controller 410 may over-write the appropriate entry 414a in buffer 412a with each copy of the line now residing in race condition 424. Then the modified new entry 414a may be written-back to the appropriate entry 404 in main memory 402.

Figure 5:
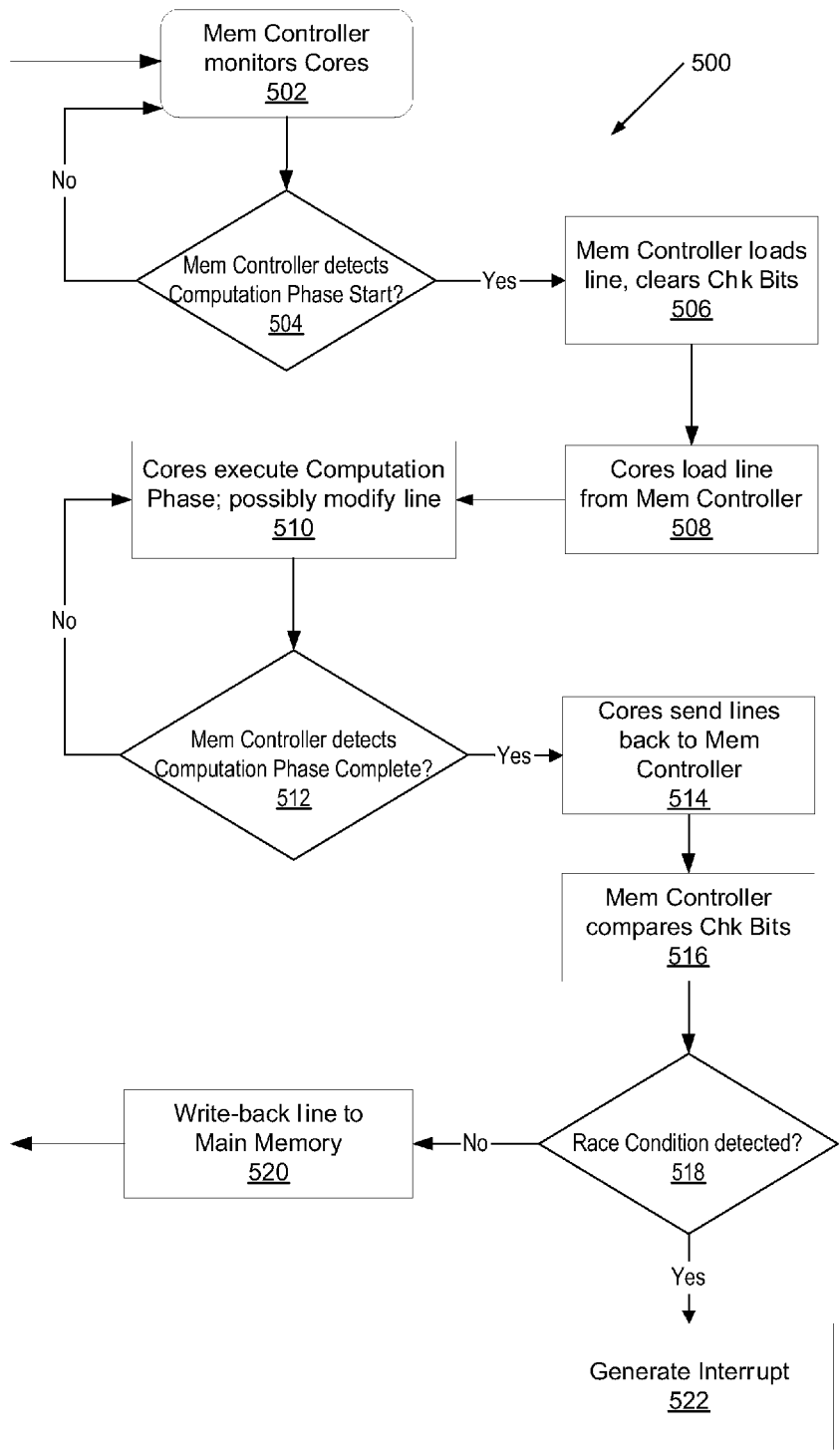
FIG. 5 is a flow diagram of one embodiment of a method for detecting coherency problems in a system during simultaneous code execution of multiple processors.

Turning now to FIG. 5, one embodiment of a method 500 for maintaining coherency is illustrated. For purposes of discussion, the steps in this embodiment are shown in sequential order. However, some steps may occur in a different order than shown, some steps may be performed concurrently, some steps may be combined with other steps, and some steps may be absent in other embodiments.

In the embodiment shown, a memory controller monitors processors in a system (block 502) possibly through a network. If the memory controller detects a start of a computation of a code sequence (decision block 504), then the memory controller loads the memory line from main memory (block 506) along with the corresponding check bits for that line. Otherwise, method 500 returns to block 502. The check bits may be an extension of the memory line or they may be stored elsewhere and may be read along with the memory line.

In block 508 any processors that need the memory line for their respective application execution receive the lines from the memory controller. The memory controller may clear the check bits at the time it loaded the line from main memory as in block 506, or at the time a first processor requests the line as in block 508. Alternatively, check bits may be cleared when stored to memory. The memory controller may make a copy of the line and check bits for each processor request. In block 510 the code may be executed and the line may be modified by one or more processors. For each subsection of the line modified, its corresponding check bit is set. Execution continues until the memory controller detects completion of a computation of a code sequence (decision block 512).

As shown in block 514, the processors return their possibly modified version of the memory line and corresponding check bits back to the memory controller. The memory controller then performs a comparison of the check bits (block 516) to see if more than one processor modified the same subsection of the memory line. If the same bit is set, then a modification of the same subsection is detected (decision block 518), and a race condition has occurred. The memory controller may then send an interrupt or trap signal to the operating system (block 522). Otherwise, a race condition is not detected and the memory controller may write-back the line and corresponding check bits to main memory (block 520). Method 500 returns to block 502 in order to continue execution of other processes until the operating system decides the next course of action.

It is noted that the above-described embodiments may comprise software. In such an embodiment, the program instructions that implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/ or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for use in a computing system, the method comprising:
    initiating execution of a code sequence;
    a first processing unit utilizing a first copy of a given memory line corresponding to the code sequence during said execution, and a second processing unit utilizing a second copy of the given memory line during said execution, said given memory line comprising a plurality of subsections and a check bit for each subsection;
    clearing first check bits prior to utilization of the first copy by the first processing unit, and clearing second check bits prior to utilization of the second copy by the second processing unit;
    the first processing unit setting a first check bit of the first check bits, in response to modifying a subsection of said first copy that corresponds to the first check bit, and the second processing unit setting a second check bit of the second check bits, in response to modifying a subsection of said second copy that corresponds to the second check bit;
    comparing first check bits of the first copy to second check bits of the second copy;
    detecting a race condition, in response to determining a same check bit is set in both of the first check bits and the second check bits; and
    generating an interrupt in response to detecting said race condition.

2. The method as recited in claim 1, further comprising storing address information corresponding to the memory line in response to detecting said race condition.

3. The method as recited in claim 1, wherein each of said subsections comprise a fixed number of bytes.

4. The method as recited in claim 3, further comprising:
    receiving said first copy from the first processing unit subsequent to completing said execution;
    receiving said second copy from the second processing unit subsequent to completing said execution; and
    storing data corresponding to both said first copy and said second copy in a main memory, if a race condition is not detected.

5. A computing system comprising:
    a first processing unit, including at least one processor, configured to utilize a first copy of a given memory line corresponding to a code sequence during execution;
    a second processing unit, including at least one processor, configured to utilize a second copy of the given memory line during said execution, said given memory line comprising a plurality of subsections and a check bit for each subsection; and
    the first processing unit setting a first check bit of first check bits, in response to modifying a subsection of said first copy that corresponds to the first check bit;
    the second processing unit setting a second check bit of second check bits, in response to modifying a subsection of said second copy that corresponds to the second check bit;
    a memory controller configured to:
        clear said first check bits prior to utilization of the first copy by the first processing unit, and clear said second check bits prior to utilization of the second copy by the second processing unit;
        compare first check bits of the first copy to second check bits of the second copy;
        detect a race condition, in response to determining a same check bit is set in both of the first check bits and the second check bits; and
        generate an interrupt in response to detecting said race condition.

6. The system as recited in claim 5, wherein the memory controller is further configured to store address information corresponding to the memory line in response to detecting said race condition.

7. The system as recited in claim 5, wherein each of said subsections comprise a fixed number of bytes.

8. The system as recited in claim 7, wherein the memory controller is further configured to:
    receive said first copy from the first processing unit subsequent to completing said execution;
    receive said second copy from the second processing unit subsequent to completing said execution; and
    store data corresponding to both said first copy and said second copy in a main memory, if a race condition is not detected.

9. A memory system comprising:
a main memory comprising a plurality of memory lines; and
a memory controller coupled to said main memory via a bus, wherein said memory controller is configured to:
  receive a first copy of a memory line;
  receive a second copy of the memory line;
  compare first check bits of the first copy to second check bits of the second copy; and
  detect a race condition, in response to determining a same check bit is set in both of the first check bits and the second check bits;
wherein each of said first check bits corresponds to a particular subsection of the first copy, and each of said second check bits corresponds to a particular subsection of the second copy; and
wherein the memory controller is further configured to generate an interrupt in response to detecting said race condition.

10. The memory system as recited in claim 9, wherein the memory controller is configured to perform said compare subsequent to completion of a code sequence execution.

11. The memory system as recited in claim 10, wherein the memory controller is configured to clear the first check bits and the second check bits prior to said execution.

12. The memory system as recited in claim 11, wherein a given bit of the first check bits is set responsive to modification of a corresponding subsection of the first copy, and a given bit of the second check bits is set responsive to modification of a corresponding subsection of the second copy.

* * * * *